United States Patent
Hristov et al.

(10) Patent No.: US 11,742,733 B2
(45) Date of Patent: Aug. 29, 2023

(54) ELECTRICAL MACHINE WITH AN AUXILIARY MOVABLE SELF-DIRECTING STATOR

(71) Applicants: Alexander Iskrenov Hristov, Vratza (BG); Georgi Iskrenov Hristov, Sofia (BG); Plamen Iskrenov Hristov, Sofia (BG)

(72) Inventors: Alexander Iskrenov Hristov, Vratza (BG); Georgi Iskrenov Hristov, Sofia (BG); Plamen Iskrenov Hristov, Sofia (BG)

(*) Notice: Subject to any disclaimer, the term of this patent is extended or adjusted under 35 U.S.C. 154(b) by 135 days.

(21) Appl. No.: 17/257,852

(22) PCT Filed: Jul. 1, 2019

(86) PCT No.: PCT/IB2019/055551
§ 371 (c)(1),
(2) Date: Jan. 4, 2021

(87) PCT Pub. No.: WO2020/008319
PCT Pub. Date: Jan. 9, 2020

(65) Prior Publication Data
US 2022/0085707 A1 Mar. 17, 2022

(30) Foreign Application Priority Data
Jul. 2, 2018 (BG) .................................. 112762

(51) Int. Cl.
*H02K 16/04* (2006.01)
*H02K 21/02* (2006.01)

(52) U.S. Cl.
CPC ........... *H02K 21/029* (2013.01); *H02K 16/04* (2013.01)

(58) Field of Classification Search
CPC ....... H02K 16/02; H02K 16/04; H02K 21/029
See application file for complete search history.

(56) References Cited

U.S. PATENT DOCUMENTS

| 5,723,928 A * | 3/1998 | Imai .................. H02K 16/04 310/209 |
| 2014/0312730 A1 | 10/2014 | Shibata et al. |

FOREIGN PATENT DOCUMENTS

| JP | 2002-204541 A | 7/2002 |
| RU | 2169423 C1 | 6/2001 |

(Continued)

OTHER PUBLICATIONS

Office Action for Russian Patent Application No. 2021102076/07(004325), dated Aug. 25, 2022.

(Continued)

*Primary Examiner* — Ramon M Barrera
(74) *Attorney, Agent, or Firm* — Marshall, Gerstein & Borun LLP (57) ABSTRACT

An electrical machine with two or more stators is proposed. One stator (1) is stationary and is fixed to the body (4) of the machine, and the second stator (6) is movable and can rotate freely to both the rotor (2) and the stationary stator (1). The movable stator (6) is self-orienting according to the lines of the magnetic field created by the electric windings and/or permanent magnets of the stationary stator (1). The movable stator (6) concentrates and shapes up the magnetic field B so that the magnetic lines are almost perpendicular to the rotor windings. The movable stator (6) does not rotate relative to the magnetic field of the stationary stator (1) and the magnetic field in it does not change, there is no continuous re-magnetization, magnetic hysteresis is avoided and no eddy currents are generated, due to which the losses and heating of the machine are reduced. The movable stator (6) may comprise permanent magnets to increase the magnetic field in the rotor active zones (2).

12 Claims, 9 Drawing Sheets

(56) References Cited

FOREIGN PATENT DOCUMENTS

| | | | |
|---|---|---|---|
| RU | 2004105940 | A | 4/2005 |
| RU | 2411623 | C2 | 2/2011 |
| SU | 780106 | A1 | 11/1980 |
| SU | 951559 | A1 | 8/1982 |
| WO | WO-2015/052124 | A2 | 4/2015 |

OTHER PUBLICATIONS

Search Report for Russian Patent Application No. 2021102076/07(004325), dated Aug. 24, 2022.

* cited by examiner fig.1 fig.2 fig.3 fig.4 fig.5 fig.6 fig.7 fig.8 fig.9
fig.10 fig.11
fig.12 fig.13
fig.14 fig.15 fig.16 fig.17 fig.18 fig.19 fig.20 fig.21 fig.22 fig.23 fig.24 fig.25 fig.26 fig.27 fig.28 fig.29 fig.30 fig.31 fig.32 fig.33 fig.34 fig.35 fig.36 fig.37 fig.38 fig.39 fig.40 fig.41 fig.42 fig.43

ELECTRICAL MACHINE WITH AN AUXILIARY MOVABLE SELF-DIRECTING STATOR

DESCRIPTION OF THE INVENTION

Field of the Invention

The present invention relates generally to electrical machines designed to convert mechanical energy into electrical and electrical energy into mechanical by using electromagnetic induction. More particularly, the present invention relates to a method of directing the magnetic field by adding to the stator and the rotor of the machine of an auxiliary self-directing element called a movable stator.

State of the Art

Each rotating electrical machine has a stator and a rotor separated by a gap. The main part of the electrical machines produced at the time of filing this patent application in motor mode use a magnetic field to transmit energy between the stator and the rotor and to transform the electrical energy into mechanical motion. In generator mode the inverse transformation takes place—the magnetic field generates an electric current in the windings. In all the electrical machines the direction of energy conversion can be changed, i.e. they can convert mechanical energy into electrical (generator mode) or electrical energy into mechanical (motor mode). The active parts of the machine are the magnetic core and the windings, which convert the energy. Losses in energy transformation generate heat. A cooling system is used to keep the temperature within acceptable limits.

When calculating the electromotive moment, the Lorentz force is applied or the force of repulsion/attraction between the same/opposite magnetic poles. In both cases the direction and magnitude of the magnetic field are crucial. The magnetic field is generated by permanent magnets and/or electromagnets of the stator, and the rotor is located within this magnetic field. All materials located between the stator's magnetic poles affect the distribution of the magnetic field, i.e. gaps and openings, ferromagnetic and paramagnetic materials redirect the magnetic lines and form areas with different direction and magnitude of the magnetic field.

In order to achieve the greatest magnetomotive force and accordingly maximum torque and efficiency, the magnetic field must be concentrated in the area of the electric current flowing in the windings, and the winding wires must be perpendicular to the magnetic field lines, i.e. ideally, the magnetic lines must be perpendicular to the surface of the rotor. The same conditions are in force when the electrical machine operates as a generator and the greatest electromotive force must be achieved.

To achieve these objectives, combinations of different materials are used in the rotor and it is formed in such a way that whatever the angle the rotor has turned the magnetic field to have "acceptable" shape, i.e. magnetic field lines to be at an angle as close to 90° as possible relative to the rotor windings. This is a serious issue because the "insensitivity" of the magnetic field relative to the angle of rotation of the rotor, and the concentration of the magnetic field are mutually contradictory tasks as the magnetic field strengthening in some areas is at the expense of its weakening in the adjacent areas, and those areas rotate together with the rotor.

The rotation of the magnetic core (as part of the rotor) leads to the generation of eddy currents in the magnetic core. In order to mitigate this issue, the rotors are fabricated from metal sheets (lamellae), compacted ferrite powder or rotors are made hollow (for example, actuating direct-current motor with hollow non-magnetic armature). This increases the motor cost price because it complicates the rotor fabrication. The currents generated depend on the magnitude change rate of the magnetic field—raising the rotational speed leads to increased losses and overheating which limits the operating range, i.e. the maximum allowable speed of rotation of the machine. Due to those losses, the efficiency drops as the machine angular speed increases. Heating causes deformation of the rotor and this further aggravates machine parameters. In the case of a motor with a hollow non-magnetic armature, the magnetic field dissipation heavily degrades the motor characteristics, and such motors are only used when fast response time is required. Direct current motor with hollow non-magnetic armature is considered one of the fastest with a time constant of a few milliseconds as the rotor has a small mass, low inertia and small time constant.

SUMMARY OF THE INVENTION

The object of the present invention is to create an electrical machine, which solves the above-mentioned drawbacks of the prior art and, in particular, to create an efficient electrical machine in which the dissipation of the magnetic field is reduced, the generation of eddy currents in the magnetic core and the heating of the rotor are lowered and, accordingly, losses are reduced and efficiency of the machine is increased.

Existing electrical machines consist essentially of two parts that move relative to one another. One part is fixed to the housing of the machine and is called the STATOR. The other part moves relative to the stator and is called ROTOR where the magnetic elements such as permanent magnets or electric windings are incorporated. The rotor is attached to the machine shaft, which thanks to the bearings can rotate freely. There is a gap between the stator and the rotor. The energy transmission between the stator and the rotor is provided via the magnetic field generated by the machine.

The present invention adds a third part of a magnetic core to the machine which part can rotate freely both with respect to the stator and the rotor. The mentioned third part in this application is called MOVABLE STATOR.

According to the present invention, the rotary electrical machine comprises a stationary stator and a movable rotor attached to a shaft with the possibility of free rotation relative to the stator. The stator is fixed to the housing of the machine. The rotor is hollow and includes windings. The electrical machine uses magnetic induction to transmit energy between the stator and the rotor. The machine also includes at least one movable stator capable of orienting to the magnetic field generated by the machine. The at least one movable stator is made at least partially of ferromagnetic materials and is located coaxially inside the hollow rotor and mounted by means of bearings to the inner part of the rotor or to the shaft with the possibility of free and independent rotation both with respect to the axis of rotation of the rotor and the shaft. The rotor is located between the stationary stator and said at least one movable stator.

The rotor could be a hollow cylinder or a hollow truncated cone.

At least one movable stator is manufactured with such a shape as to guide magnetic lines generated by the stator magnetic field so that the magnetic lines are at an angle as close as possible to 90° relative to the rotor windings. At least one movable stator is oriented towards the poles of the magnetic field generated by the stator as a compass needle is oriented towards the Earth's magnetic field. Since the movable stator does not move relative to the magnetic field, its ferromagnetic material magnetizes and becomes a weak magnet, which leads to an amplification of the magnetic field and improves the orientation of the movable stator. When the ferromagnetic material of the rotor of the existing machines magnetizes and turns into a weak magnet, the rotor strives to remain orientated towards the magnetic lines and part of the generated magnetomotive force has to overcome this resistance, which leads to a decrease in the efficiency. The movable stator stays always in the same position relative to the magnetic field generated by the stator, and the need for the movable stator to conduct a magnetic field in all directions is eliminated. The shape of the movable stator is simpler and easier to produce. Less material is needed to produce the rotor along with the movable stator compared to the rotor of existing machines, and the machine becomes more lightweight. Eddy currents are not generated in the movable stator, because it is stationary relative to the stator-generated magnetic field, so it does not have to be made of lamellae or to use other techniques to reduce the heat, the losses from eddy current and the dependence of heating on the machine rotational speed. The ferromagnetic materials magnetize as their domains orientate in the direction of the magnetic lines. Since the movable stator is stationary with regard to the stator-generated magnetic field, the reorientation of the domains, the loss of energy required for the process, and the heat generated by the re-magnetization are avoided.

In one embodiment, the ferromagnetic material in said at least one movable stator forms a body passing through the geometry axis of said at least one movable stator and having in cross-section an elongated profile extending between two diametrically opposed peripheral zones of said at least one movable stator.

There is a gap between the rotor and said at least one movable stator. In one embodiment version, said at least one movable stator is mounted on the machine shaft by means of bearings and can rotate freely about the axis of rotation of the rotor. Thus, at least one movable stator can change its orientation both relative to the rotor and the stator. The rotor of the machine moves between the two stators—stationary and movable.

Depending on the type of the electrical machine, said at least one movable stator may rotate or not relative to the machine housing. For example, in a brushed direct current motor, the movable stator stays stationary and it is affected by the offset of the magnetic field generated by the current in the rotor windings, but techniques improving engine performance and avoiding sparking only affect the equilibrium position of the movable stator, but not its angular speed, which will be zero after reaching a set mode. In an induction motor, the movable stator rotates at the angular velocity of the magnetic field generated by the stator windings, i.e. faster than the rotor, and after reaching the set mode (constant rotation of the magnetic field generated by the stator windings), the movable stator will stay stationary relative to the stator magnetic field.

Preferably, the rotor is hollow, and at least one auxiliary movable stator is located inside thereof with the possibility to rotate coaxially.

In one embodiment, the rotor is a hollow cylinder located between the stator and said at least one movable stator. Alternatively, the rotor may be a hollow cone located between the stator and said at least one movable stator. Alternatively, the rotor may be a combination of a hollow cylinder and a hollow cone, for example, a cylinder beveled at both ends forming two cones and a cylinder stuck together.

In one embodiment of the electrical machine, said at least one auxiliary movable stator is mounted by bearings to the shaft with the possibility of free rotation. Alternatively, said at least one auxiliary movable stator may be mounted by bearings directly to the inner surface of the rotor with the possibility of free rotation.

In a preferred embodiment, the ferromagnetic material in said at least one movable stator forms two or more bodies on the periphery of the movable stator, identical in shape and arranged symmetrically with respect to the axis of rotation.

Preferably, the ferromagnetic part of said at least one movable stator is at least partially made of permanent magnets. Even more preferably, the ferromagnetic part of said at least one movable stator is made entirely of permanent magnets.

It is possible that said at least one movable stator is partially made of paramagnetic materials in areas where it has not to conduct a magnetic field outside the ferromagnetic material zones.

In one embodiment, the stators have a cross-section with axial symmetry relative to the axis of rotation of the machine and, accordingly, generate a magnetic field with axial symmetry relative to the axis of rotation of the machine. Alternatively, the stators may be arranged so as to generate an asymmetric magnetic field.

It is possible that the number of poles of said at least one movable stator is the same as of the poles of the magnetic field generated by the stator.

It is possible that the permanent magnets of said at least one movable stator build a bipolar magnet.

It is possible that the stators are only located in one part of the periphery of the machine rotor.

It is also possible the electrical machine to have more than two magnetic poles.

It is possible that the number of poles of the electrical machine is odd.

In general, the use of ferromagnetic materials for making the movable stator simplifies the design of the machine and reduces the losses. Operational characteristics improve but do not differ significantly from the characteristics of existing machines. When using permanent magnets in the movable stator, the magnitude of the magnetic field generated in the area of the rotor is increased as it is a vector sum of the magnetic fields of the stator and of the permanent magnets of the movable stator. Thereby the torque of the electrical machine is increased because the Lorentz force and hence the power output are proportional to the magnitude of the magnetic field in the area of the rotor windings.

The movable stator according to the invention, concentrates and forms the magnetic field B so that the magnetic lines are nearly perpendicular to the rotor windings. The movable stator does not rotate relative to the magnetic field of the stationary stator and the magnetic field in it does not change, there is no continuous re-magnetization, magnetic hysteresis is avoided and no eddy currents are generated, thus reducing the losses and heating of the machine.

DESCRIPTION OF THE DRAWINGS

In more details, the electrical machine according to the invention is illustrated by preferred embodiments given as non-limiting examples of the invention, with reference to the accompanying drawings, wherein.

In all figures, individual parts are not shaded in order to provide a better view of the magnetic lines. In gray are shown the parts of the stationary and movable stators, which generate or affect the magnetic field. Dark gray parts generate a magnetic field and light gray parts just redirect it.

In all the figures, the same geometric dimensions are used to compare correctly the simulation results in the static position of the machine parts depicted.

DETAILED DESCRIPTION OF EMBODIMENTS OF THE INVENTION

The present invention is applicable to various types of electrical machines operating in generator or motor mode. For example, direct current motors, induction motors, etc. Although the invention is applicable to various types of motors and generators, the drawings are considering brushed direct current motors and induction motors, in order to explain the concept, which is the same for all electrical machines. The attached figures do not cover/exhaust all possible configurations.

Figure 1:
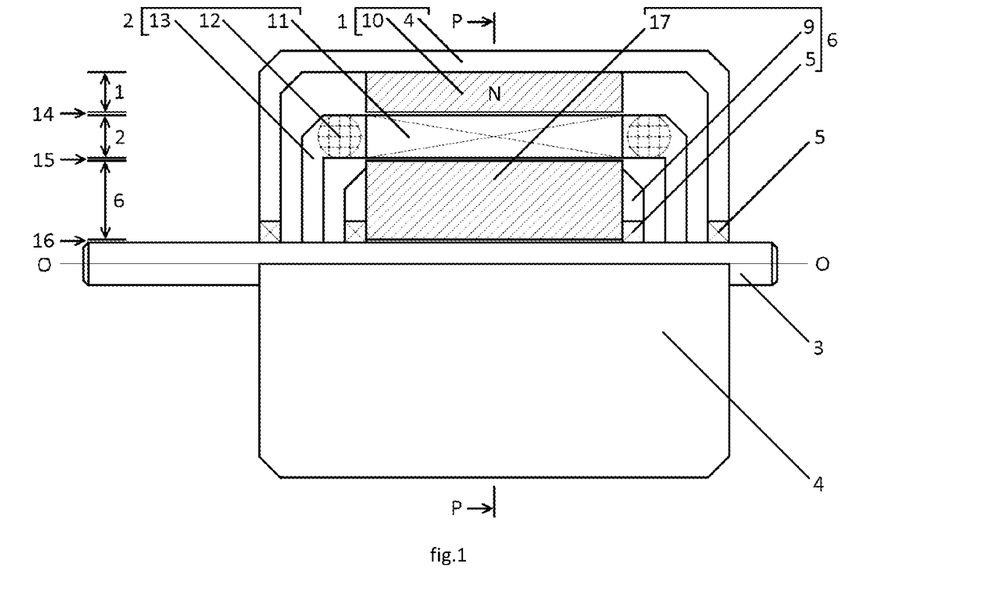
FIG. 1 shows a simplified longitudinal top view of a brushed direct current motor with a homogeneous movable stator.
Figure 2:
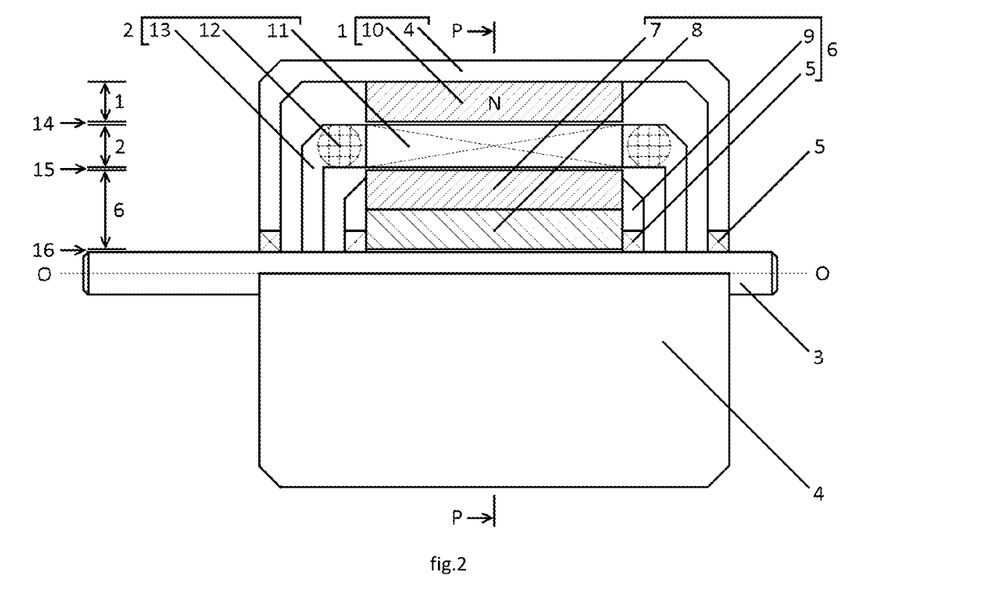
FIG. 2 shows a simplified longitudinal top view of a brushed direct current motor with a movable stator consisting of an internal part and an external layer made of different materials.
Figure 3:
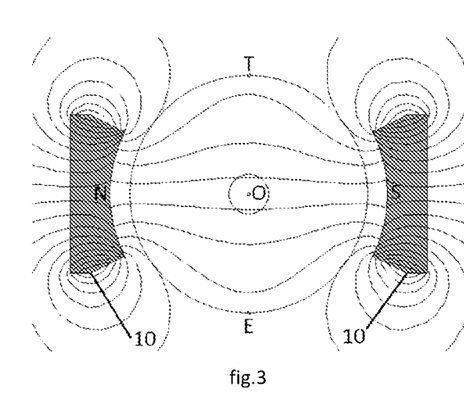
FIG. 3 shows a cross-section of the machine of FIG. 1 with a stator represented by two permanent magnets N and S (only the rotor-side poles are marked). The movable stator made of paramagnetic material is not shown in order to expose the shape of the magnetic field produced by the two magnets N and S of the stationary stator.
Figure 4:
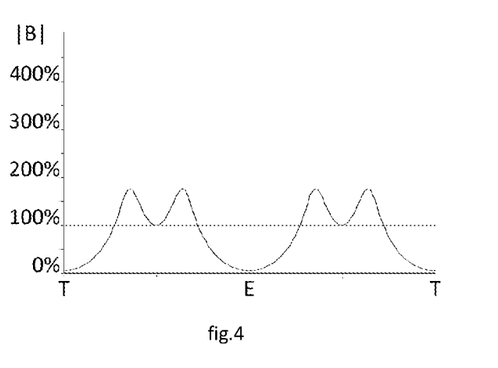
FIG. 4 shows the magnitude of the magnetic field on the T-E-T loop of the machine of FIG. 3.

FIGS. 1 and 2 show a simplified longitudinal top view of a brushed direct current motor. Only the design of the stators and the rotor is shown. The commutators are not shown in the figures, as they have no direct relation to the invention. The permanent magnets 10 of the stationary stator 1 are attached to the motor housing 4 (fasteners not shown). The bearings 5 allow the shaft 3 to rotate freely around the O-O axis. The hollow rotor 2 is attached through the fasteners 13 to the shaft 3 and rotates together with it. The movable stator 6 is set inside the rotor 2. In FIG. 1 the movable stator 6 is made of homogeneous material 17, while the movable stator 6 of FIG. 2 consists of an outer part 7 and an inner part 8 in order to show that the movable stator 6 can comprise various materials. The movable stator 6 is separated from the shaft 3 by a gap 16. The fasteners 9 and the bearings 5 allow the movable stator 6 to rotate freely about the motor shaft 3. To the left in FIGS. 1 and 2 are shown the areas occupied by the individual parts of the machine—the shaft 3, the movable stator 6, the rotor 2, and the stationary stator 1, representing nested cylinders separated by gaps. The rotor 2 is separated from the stationary stator 1 and the movable stator 6 by gaps 14 and 15. Thus the stationary stator 1, the rotor 2, and the movable stator 6 can rotate freely relative to one another. The rotor package 11 is placed between the magnets of the stator 1 and the outer part 7 of the movable stator 6. The armature coil 12 and the fasteners 13 of the rotor 2 are placed outside the area enclosed between the magnets of the stator 1 and the movable stator 6.

Figure 7:
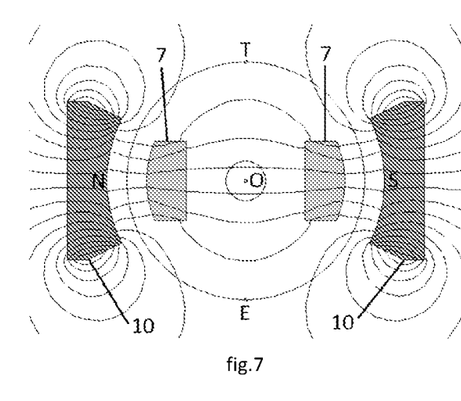
FIG. 7 shows a cross-section of the machine of FIG. 2 with a stator represented by two permanent magnets N and S. The movable stator is composed of two parts—ferromagnetic and internal paramagnetic ones.
Figure 8:
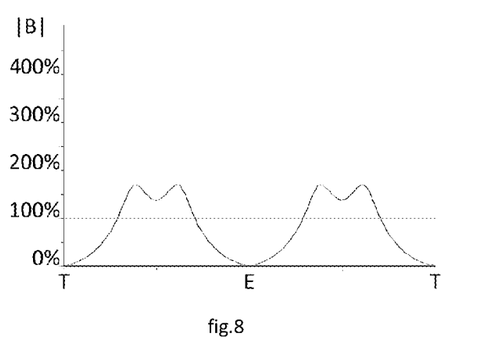
FIG. 8 shows the magnitude of the magnetic field on the T-E-T loop of the machine of FIG. 7.
Figure 9:
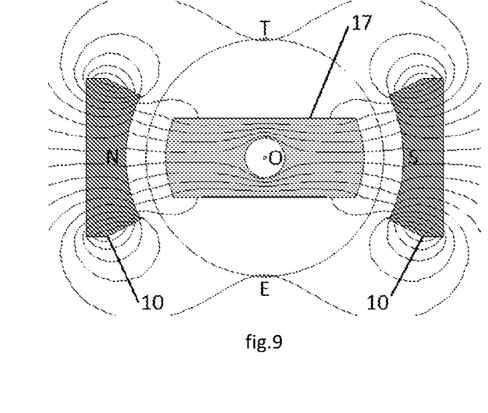
FIG. 9 shows a cross-section of the machine of FIG. 1 with a stator represented by two permanent magnets N and S. The movable stator is made of dense ferromagnetic material.
Figure 10:
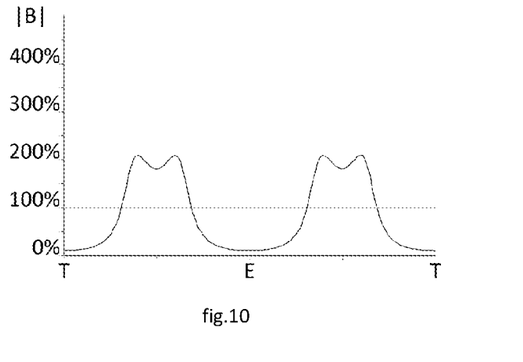
FIG. 10 shows the magnitude of the magnetic field on the T-E-T loop of the machine of FIG. 9.
Figure 11:
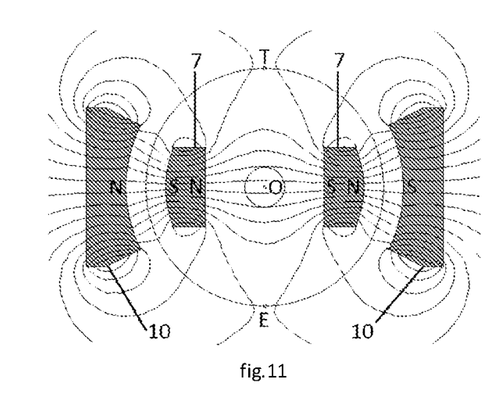
FIG. 11 shows a cross-section of the machine of FIG. 2 with a stator represented by two permanent magnets N and S. The movable stator is composed of two parts—permanent magnets and an internal paramagnetic part.
Figure 12:
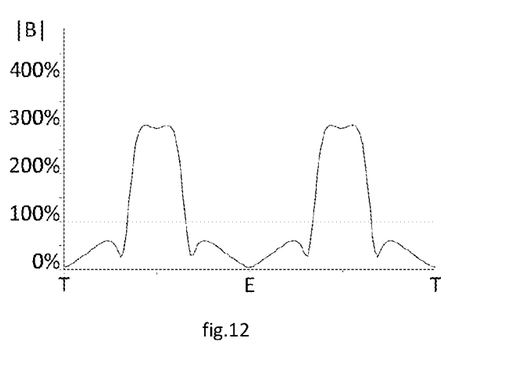
FIG. 12 shows the magnitude of the magnetic field on the T-E-T loop of the machine of FIG. 11.
Figure 13:
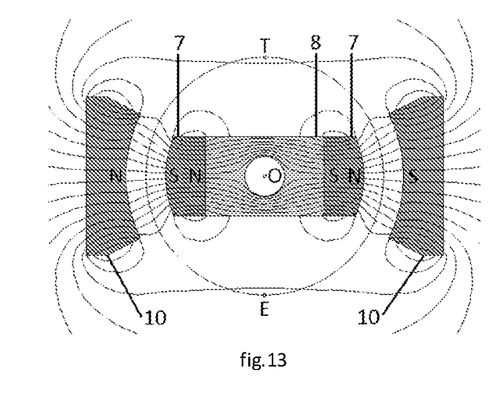
FIG. 13 shows a cross-section of the machine of FIG. 2 with a stator represented by two permanent magnets N and S. The movable stator is composed of two parts—permanent magnets and an internal ferromagnetic part.
Figure 14:
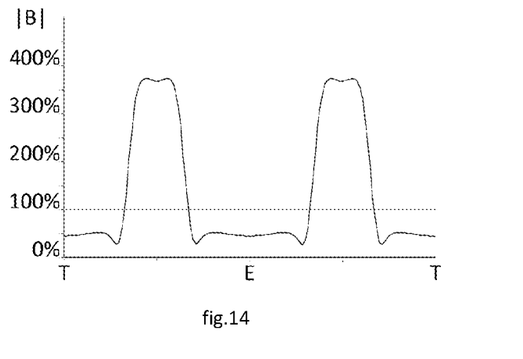
FIG. 14 shows the magnitude of the magnetic field on the T-E-T loop of the machine of FIG. 13.

FIGS. 3, 5, 9, and 15 show cross-sections in the P-P plane of different models of the two-pole direct current motor of FIG. 1. FIGS. 7, 11, and 13 show cross-sections in the P-P plane of different models of the two-pole direct current motor of FIG. 2. Only the two magnets 10 of the stator 1 are shown. The rotor 2 is not shown in order to provide a better view of the magnetic lines. The shaft 3 of the machine together with the rotor 2 rotate around the axis O-O which is perpendicular to the shown plane P-P. The movable stator 6 can be made of various materials—paramagnetic (represented by air), ferromagnetic (represented by anode iron), and permanent magnets of the same type as the magnets 10 of the stationary stator 1.

Figure 15:
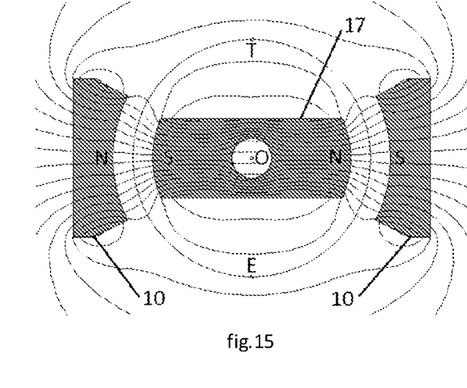
FIG. 15 shows a cross-section of the machine of FIG. 1 with a stator represented by two permanent magnets N and S. The movable stator is made of a whole permanent magnet.
Figure 16:
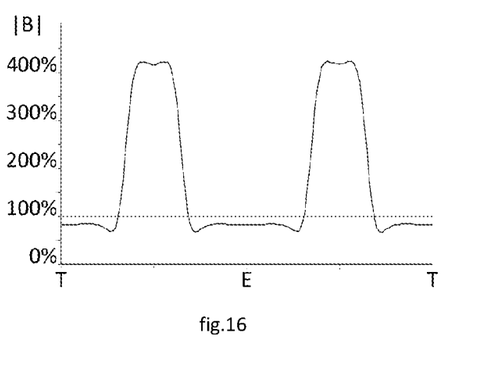
FIG. 16 shows the magnitude of the magnetic field on the T-E-T loop of the machine of FIG. 15.

FIGS. 4, 6, 8, 10, 12, 14, and 16 show the magnitude of the magnetic field in the middle of the rotor channel between the magnets of the stator 1 and the movable stator 6. The charts show dimensionless magnetic field along the T-E-T loop as the field in the middle of the magnets 10, where the magnetic lines are perpendicular to the T-E-T loop, for a movable paramagnetic stator 6 is assumed to be 1.0, i.e. 100%. When paramagnetic and ferromagnetic materials are used in the movable stator 6, the magnetic field is not increased but only redirected. When permanent magnets are used in movable stator 6 the magnetic field increases by the magnitude of the magnetic field generated by those magnets. Depending on the machine design, the increase is different and depends on the ratio of the magnetic fields generated by the stator 1 and the movable stator 6. In the exemplary embodiments, the total magnetic field of the direct current motor version of FIG. 15 is up to 300% stronger compared to embodiments without auxiliary magnets., i.e. the motor of FIG. 15 is 2 to 4 times more potent than the embodiments shown in FIGS. 3, 5, 7, and 9. The increase by using auxiliary permanent magnets in the movable stators 6 depends on the particular parameters of the machine and cannot be generalized for all types of machines having different dimensions, designs and using various materials. What is common is the magnetic field increase due to the addition of an extra magnetic field created by the permanent magnets of the movable stators 6.

Figure 17:
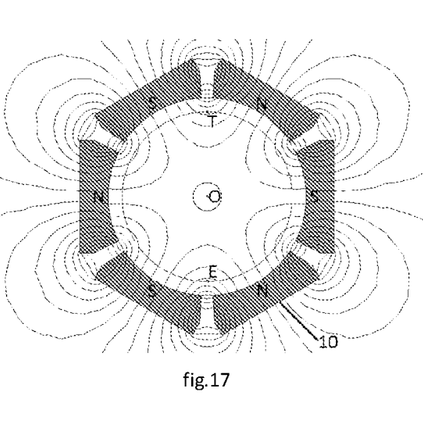
FIG. 17 shows a cross-section of the machine of FIG. 1 with a stator represented by six permanent magnets N and S. The movable stator made of paramagnetic material is not shown in order to expose the shape of the magnetic field produced by the six magnets N and S of the stationary stator.
Figure 19:
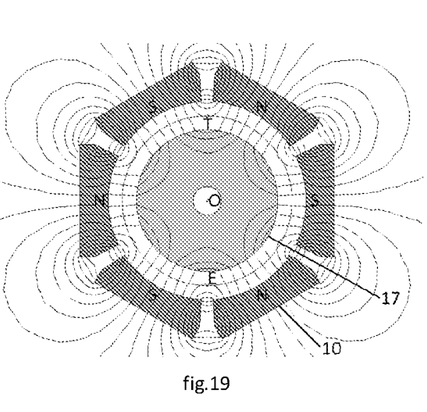
FIG. 19 shows a cross-section of the machine of FIG. 1 with a stator represented by six permanent magnets N and S. The movable ferromagnetic stator is in the form of a homogeneous cylinder.
Figure 21:
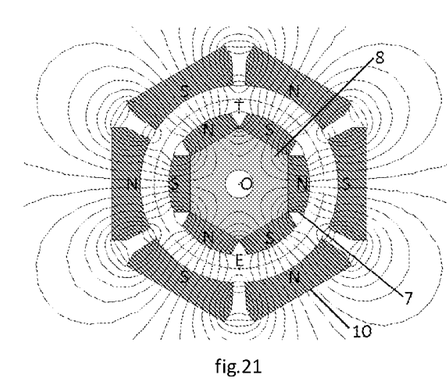
FIG. 21 shows a cross-section of the machine of FIG. 2 with a stator represented by six permanent magnets N and S. The movable stator is composed of two parts—permanent magnets and a ferromagnetic part.

FIGS. 17 and 19 show the cross-sections in the P-P plane of different models of the six-pole direct current motor of FIG. 1. FIG. 21 shows a cross-section in the plane P-P of the six-pole direct current motor of FIG. 2. Only the six magnets 10 of stator 1 are shown. The rotor 2 is not shown in order to provide a better view of the magnetic lines. The machine shaft 3 together with the rotor 2 rotate about the axis O-O which is perpendicular to the shown cut P-P. The given embodiments of two- and six-pole direct current motors show that the poles of the stationary stator 1 and the movable stator 6 have to match both in number and in the arrangement of the poles, as opposite poles stand each against other. The movable stator 6 is oriented relative to the magnetic field of the stationary stator 1 and, therefore, the movable stator 6 is always in the "correct" position with no need of a control system or any mechanical gear. The movable stator 6 is made of different materials—paramagnetic (represented by air), ferromagnetic (represented by anode iron) and permanent magnets of the same type as the magnets 10 of the stationary stator 1.

Figure 18:
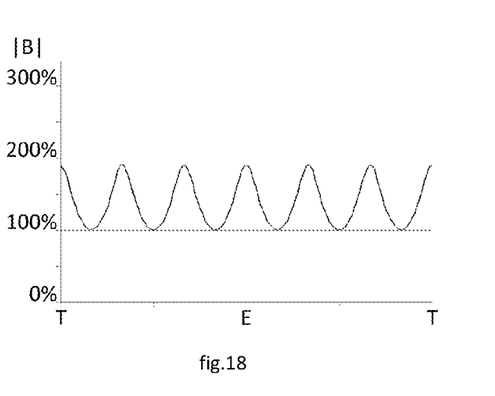
FIG. 18 shows the magnitude of the magnetic field on the T-E-T loop of the machine of FIG. 17.
Figure 20:
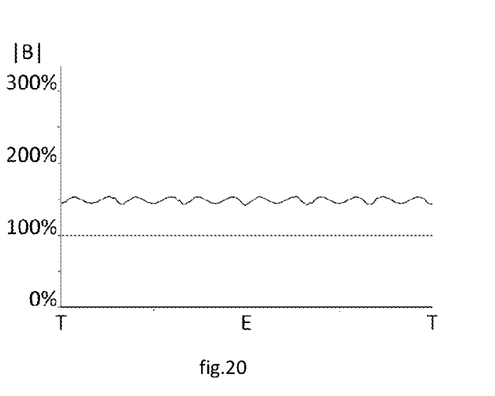
FIG. 20 shows the magnitude of the magnetic field on the T-E-T loop of the machine of FIG. 19.
Figure 22:
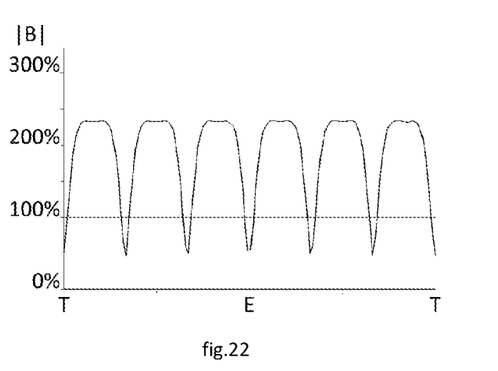
FIG. 22 shows the magnitude of the magnetic field on the T-E-T loop of the machine of FIG. 21.

FIGS. 18, 20 and 22 show the magnitude of the magnetic field in the middle of the rotor channel between the magnets of the stator 1 and the movable stator 6. The charts show dimensionless magnetic field along the T-E-T loop as the field in the middle of the magnets 10, where the magnetic lines are perpendicular to the T-E-T loop, for a movable paramagnetic stator 6 is assumed to be 1.0, i.e. 100%. When paramagnetic and ferromagnetic materials are used in the movable stator 6, the magnetic field is not increased but only redirected, and when permanent magnets are used in movable stator 6 the magnetic field increases by the magnitude of the magnetic field generated by those magnets. Depending on the machine design, the gain is different and depends on the ratio of the magnetic fields generated by the stator 1 and the movable stator 6. In the exemplary embodiments, the total magnetic field of the direct current motor version of FIG. 21 is 50% to 120% stronger compared to embodiments without auxiliary magnets, i.e. the motor of FIG. 21 is 1.5 to 2.2 times more potent than the embodiments shown in FIGS. 17 and 19. Increase by using auxiliary permanent magnets in the movable stators 6 depends on the particular parameters of the machine and cannot be generalized for all types of machines having different dimensions, designs and using different materials.

Figure 23:
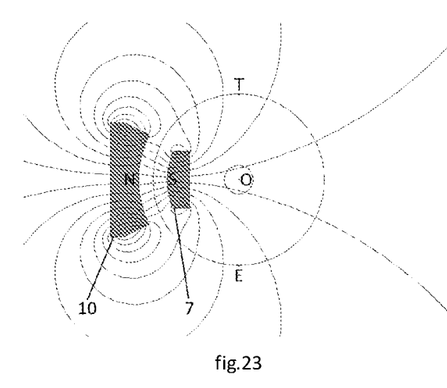
FIG. 23 shows a cross-section of an asymmetric machine similar to the machine of FIG. 21 with a stator presented by only one permanent magnet N. The movable stator is made of two parts—a permanent magnet and a ferromagnetic part.
Figure 24:
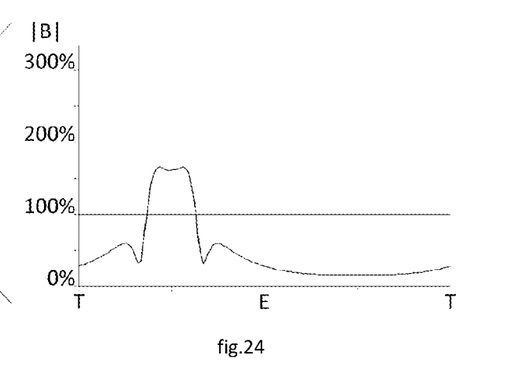
FIG. 24 shows the magnitude of the magnetic field on the T-E-T loop of the machine of FIG. 23.
Figure 25:
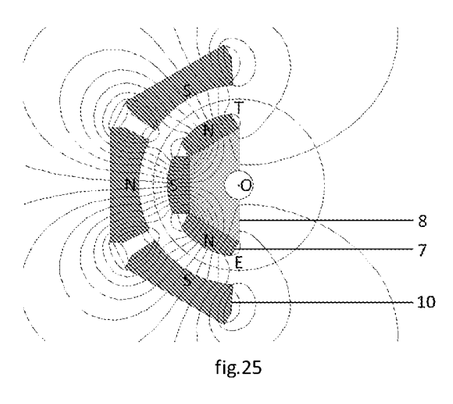
FIG. 25 shows a cross-section of an asymmetric machine similar to the machine of FIG. 21 with a stator represented by only three permanent magnets N and S. The movable stator is composed of two parts—permanent magnets and a ferromagnetic part.
Figure 26:
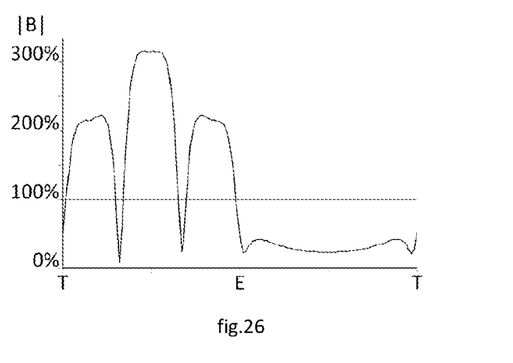
FIG. 26 shows the magnitude of the magnetic field on the T-E-T loop of the machine of FIG. 25.

The movable stator 6 generally has an axial symmetry around the axis of rotation of the rotor 2 of the machine, since if the mass center of the movable stator 6 does not lie on the axis of rotation, the equilibrium position of the movable stator 6 will depend not only on the magnetic field created by the stator 1 of the electrical machine but also will be affected by gravity and other forces and accelerations to which the machine is subjected, i.e. the orientation of the machine. The magnetic field generated by the stator 1 attracts the movable stator 6. When the stators 1 and 6 are symmetrical, the forces of attraction between the magnets of the stator are mutually balanced and the resulting force is zero, i.e. only torque is generated. Moreover, the movable stator 6 rotates around the machine shaft 3 and, if unbalanced, the bearings will wear unevenly and therefore will have a lesser resource (shorter life). Therefore, embodiments such as those shown in FIGS. 23 and 25 can be applied when the environment imposes restrictions as the presence of strong external electromagnetic fields, high temperature (for example, work near a metallurgical furnace), limited space (impossible for the stationary stator 1 to be symmetrical due to lack of space for installation) or need to reduce electromagnetic interference generated by the machine (where stators are missing, magnetic field is much weaker). FIGS. 23 and 25 show cross-sections in the P-P plane of different asymmetric model of the direct current motor of FIG. 1. Only the magnets 10 of stator 1 are shown. The rotor 2 is not shown in order to provide a better view of the magnetic lines. The machine shaft 3 together with the rotor 2 rotate around the axis O-O which is perpendicular to the shown cut P-P. The movable stator 6 is made of permanent magnets of the same type as the magnets 10 of the stationary stator 1. Dimensions and materials of the parts are the same as of the embodiment of FIG. 21. FIGS. 24 and 26 show the magnitude of the magnetic field in the middle of the rotor channel between the magnets of the stator 1 and the movable stator 6. The charts show dimensionless magnetic field along the T-E-T loop as the field in the middle of the magnets 10 of the stationary stator 1 of the motor in FIG. 17 is assumed to be 100%. The rotor 2 may be even partial if it is not necessary to make full turnovers.

Figure 27:
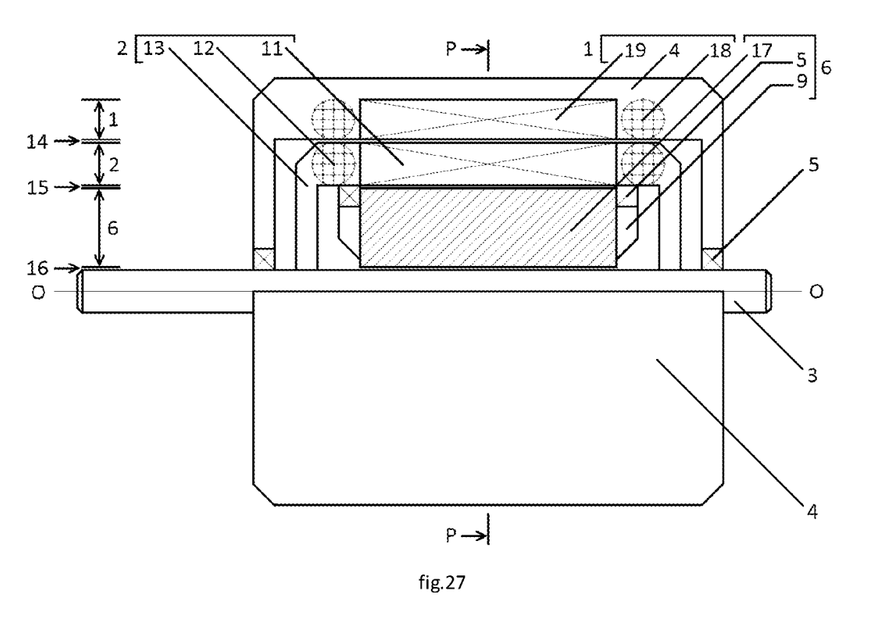
FIG. 27 shows a simplified longitudinal top view of an induction motor with a homogeneous movable stator.

FIG. 27 shows a simplified longitudinal top view of an induction motor with a squirrel cage rotor winding. Only the structure of the stators and the rotor is shown. Windings 19 of the stationary stator 1 are fixed to the body 4 of the motor. Bearings 5 allow the shaft 3 to rotate freely around the O-O axis. The hollow rotor 2 is attached by means of the fasteners 13 to the shaft 3 and rotates together with it. Inside the rotor 2 is situated homogenous movable stator 6 made up of magnetic core 17 and fasteners 9. The movable stator 6 is attached to the rotor 2 by means of the fasteners 9 and bearings 5 and can rotate freely around the rotation axis O-O of the motor. The movable stator 6 is separated from the rotor 2 by a gap 15. The movable stator 6 is separated from the shaft 3 by a gap 16. To the left of FIG. 27 are shown the areas occupied by the individual parts of the machine—the shaft 3, the movable stator 6, the rotor 2, and the stationary stator 1, representing nested cylinders separated by gaps. The rotor 2 is detached from the stationary stator 1 and the movable stator 6 by gaps 14 and 15. Thus the stationary stator 1, the rotor 2, and the movable stator 6 can rotate freely relative to one another. The rotor windings 11 are located between the windings of the stator 1 and the movable stator 6.

Figure 28:
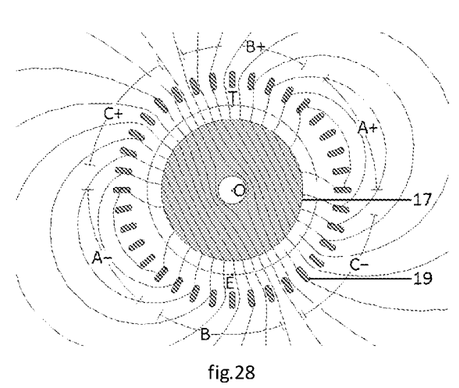
FIG. 28 shows a cross-section of the machine of FIG. 27 with a stator represented by the windings of the three phases offset at 120°. The movable ferromagnetic stator is in the form of a homogeneous cylinder.
Figure 30:
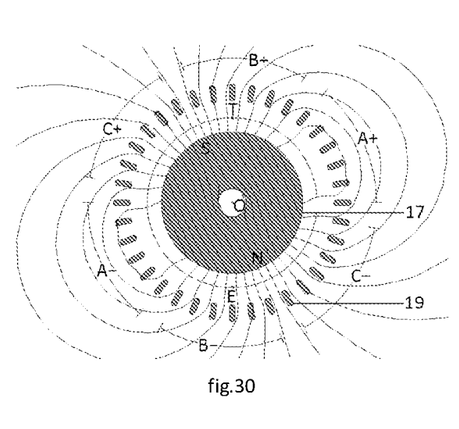
FIG. 30 shows a cross-section of the machine of FIG. 27 with a stator represented by the windings of the three phases offset at 120°. The movable stator is a permanent magnet in the form of a homogeneous cylinder.

FIGS. 28 and 30 show cross-sections in the P-P plane of different configurations of the induction motor of FIG. 27. Of the stationary stator 1, only stator winding channels are shown—there are 36 channels for the three shifted by 120° phases A, B, and C of the stator windings 19 that generate a rotating bipolar magnetic field. The rotor 2 is not shown in order to provide a better view of the magnetic lines. The shaft 3 of the machine together with the rotor 2 rotate around the axis O-O which is perpendicular to the shown plane P-P. The movable stator 6 can be made of various materials—ferromagnetic and permanent magnets.

Figure 29:
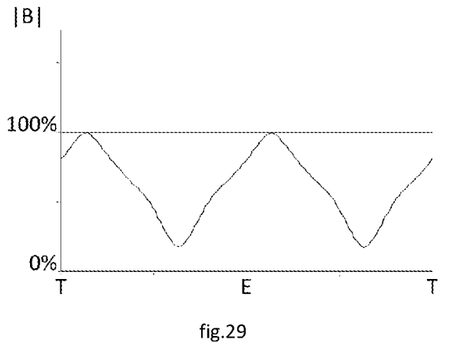
FIG. 29 shows the magnitude of the magnetic field on the T-E-T loop of the machine of FIG. 28.
Figure 31:
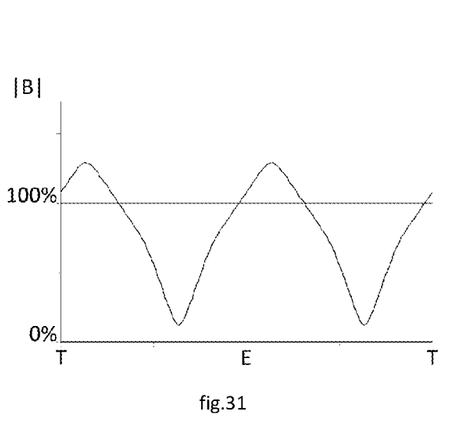
FIG. 31 shows the magnitude of the magnetic field on the T-E-T loop of the machine of FIG. 30.

FIGS. 29 and 31 show the magnitude of the magnetic field in the middle of the rotor channel between the magnets of the stationary stator 1 and the movable stator 6. The charts show dimensionless magnetic field along the T-E-T loop as the field of the movable ferromagnetic stator 6 is assumed to be 1.0, i.e. 100%. When permanent magnets are used in movable stator 6 the magnetic field increases by the magnitude of the magnetic field generated by those magnets. Depending on the machine design, the increase is different and depends on the ratio of the magnetic fields generated by the stator 1 and the movable stator 6.

Figure 32:
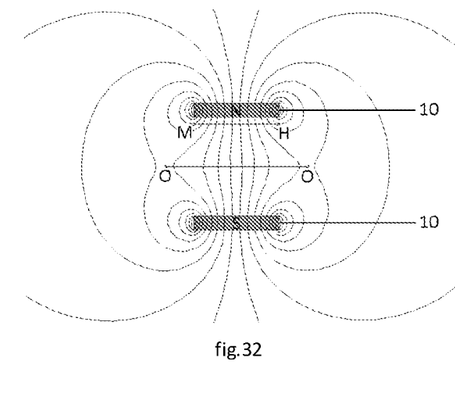
FIG. 32 shows a longitudinal section of the machine of FIG. 1 with a stator represented by two permanent magnets N and S. The movable stator made of paramagnetic material is not shown in order to expose the shape of the magnetic field produced by the two magnets N and S of the stationary stator.
Figure 34:
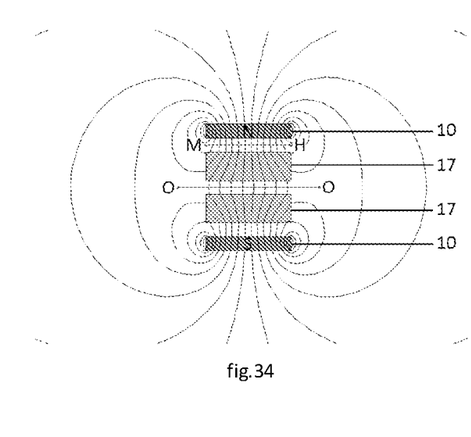
FIG. 34 shows a longitudinal section of the machine of FIG. 1 with a stator represented by two permanent magnets N and S. The movable stator is made of ferromagnetic material.
Figure 36:
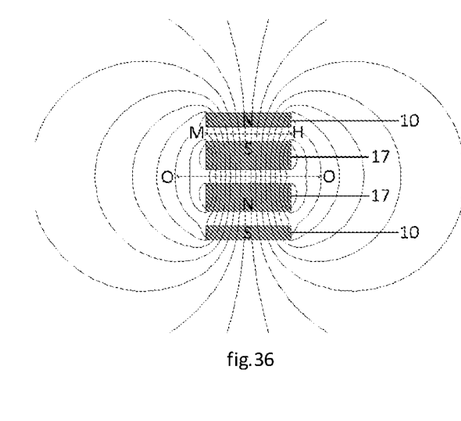
FIG. 36 shows a longitudinal section of the machine of FIG. 1 with a stator represented by two permanent magnets N and S. The movable stator is made of permanent magnets.

The fact that the magnetic field is created between the stationary stator 1 and the movable stator 6 allows the machine to take various shapes in which the rotor can rotate in the channel formed by the stators. FIG. 32 shows a longitudinal sectional view of the machine of FIGS. 1 and 3. FIG. 34 shows a longitudinal sectional view of the machine of FIGS. 1 and 9. FIG. 36 shows a longitudinal section of the machine of FIGS. 1 and 15. From the stator 1 only the two magnets 10 are shown. The rotor 2 is not shown in order to provide a better view of the magnetic lines. The shaft 3 of the machine together with the rotor 2 rotates around the axis O-O. The movable stator 6 is made up of different materials—paramagnetic (represented by air), ferromagnetic (represented by anode iron) and permanent magnets of the same type as the magnets 10 of the stationary stator 1.

Figure 33:
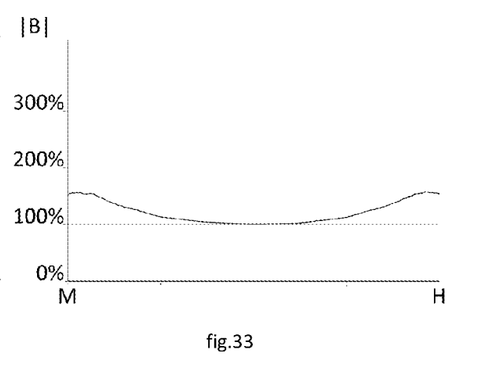
FIG. 33 shows the magnitude of the magnetic field along the M-H line of the machine of FIG. 32.
Figure 35:
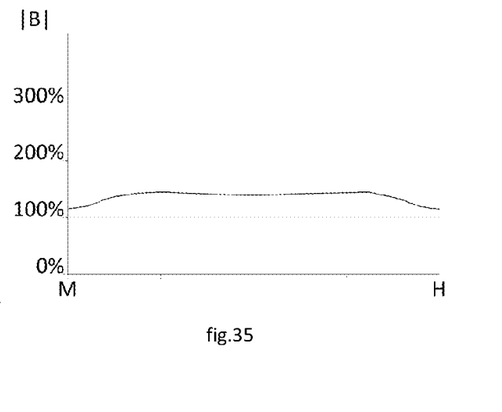
FIG. 35 shows the magnitude of the magnetic field along the M-H line of the machine of FIG. 34.
Figure 37:
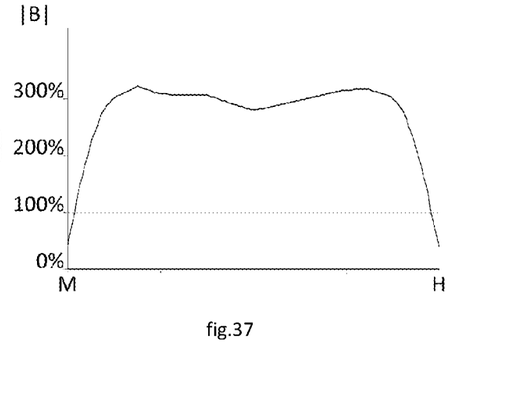
FIG. 37 shows the magnitude of the magnetic field along the M-H line of the machine of FIG. 36.
Figure 38:
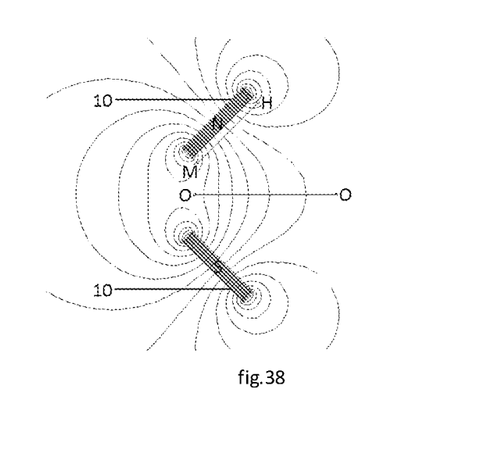
FIG. 38 shows a longitudinal section of a conical machine with a stator represented by two permanent magnets N and S. The movable stator made of paramagnetic material is not shown in order to expose the shape of the magnetic field produced by the two magnets N and S of the stationary stator.
Figure 39:
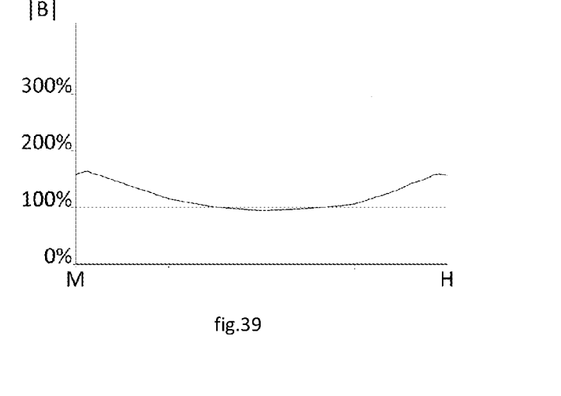
FIG. 39 shows the magnitude of the magnetic field along the M-H line of the machine of FIG. 38.
Figure 40:
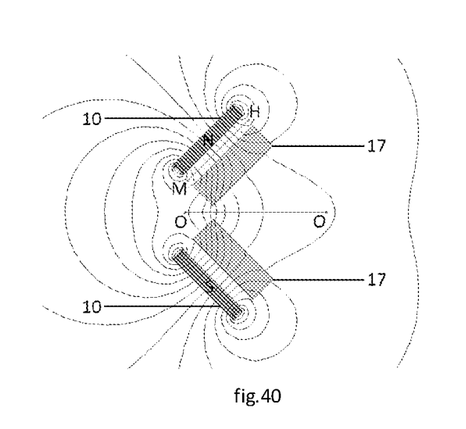
FIG. 40 shows a longitudinal section of a conical machine with a stator represented by two permanent magnets N and S. The movable stator is made of ferromagnetic material.
Figure 41:
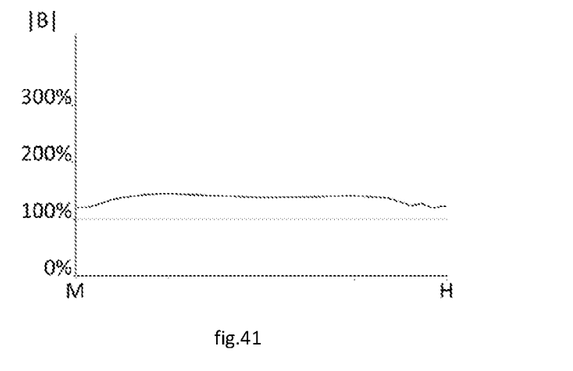
FIG. 41 shows the magnitude of the magnetic field along the M-H line of the machine of FIG. 40.
Figure 42:
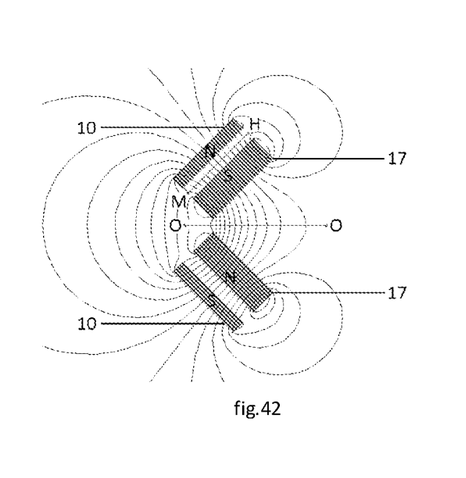
FIG. 42 shows a longitudinal section of a conical machine with a stator represented by two permanent magnets N and S. The movable stator is made of permanent magnets.
Figure 43:
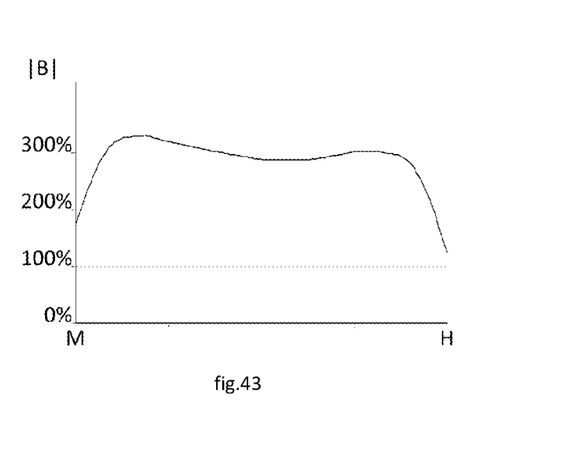
FIG. 43 shows the magnitude of the magnetic field along the M-H line of the machine of FIG. 42.

FIGS. 33, 35 and 37 show the magnitude of the magnetic field in the middle of the rotor channel between the magnets of the stationary stator 1 and the movable stator 6. The charts show dimensionless magnetic field along the line M-H as the field in the middle of the magnets 10, where the magnetic lines are perpendicular to the rotor 2, for a movable paramagnetic stator 6 is assumed to be 1.0, i.e. 100%. When paramagnetic and ferromagnetic materials are used in the movable stator 6, the magnetic field is not amplified but only redirected, but when permanent magnets are used in movable stator 6 the magnetic field increases by the magnitude of the magnetic field generated by those magnets. Depending on the machine design, the gain is different and depends on the ratio of the magnetic fields generated by the stator 1 and the movable stator 6. FIGS. 38, 40 and 42 show versions of the motors of FIGS. 32, 34 and 36, wherein the rotor located in the channel between the stators is a hollow cone. FIGS. 39, 41 and 43 show the magnitude of the magnetic field in the middle of the rotor channel between the magnets of the stationary stator 1 and the movable stator 6. In the graphs, the magnetic field along the line M-H is shown as the field in the middle of the magnets 10, where the magnetic lines are perpendicular to the rotor 2, for the motor of FIG. 32 is assumed to be 1.0, i.e. 100%.

The separation of the rotor 2 and the movable stator 6 results in a number of effects that improve the characteristics of the electrical machines. In the embodiment in which the rotor 2 is hollow and inside it is placed at least one of the movable stators 6, therefore, the rotor mass is reduced. This ensures less machine load, lower rotor inertia, shorter response time and easier starting the machine, i.e. better dynamic characteristics are achieved similar to a motor with a hollow non-magnetic armature. The magnetic field is formed in the area between the stators 1 and 6 where the rotor 2 is located, and this allows better directing and concentrating of the magnetic lines. When the rotor 2 is a hollow cylinder, the inserted movable stator 6 may not be cylindrical in shape, because the direction of the magnetic field is known in advance and does not have to conduct magnetic field in all directions—so there are protrusions where the magnetic field should be concentrated and cavities can be left where the magnetic field is not needed. This makes the machine lighter in weight. In the embodiments shown in FIGS. 1 to 16 for a two-pole direct current motor, the movable stator 6 is part of a cylinder which is shaped like a parallelepiped, since there are only two poles of the stator magnetic field. As shown in FIGS. 1, 2 and 17 to 22 for a six-pole direct current motor, the movable stator 6 generally resembles a flat toothed gear, where the teeth are made of ferromagnetic material and the material in the space between teeth is not ferromagnetic or is completely missing. The number and arrangement of the poles of the permanent magnets on the movable stators 6 depend on the design of the stationary stator 1 as in the set position against each pole of the magnetic field of the stationary stator 1 there is an opposite magnetic pole of the movable stator 6.

With the usage of permanent magnets in the movable stator 6, the magnetic field in the rotor area is a vector sum of the magnetic fields of the stationary stator 1 and the movable stator 6. Under existing electrical machines is not possible to use auxiliary magnets embedded in the rotor in space of movable stator because their magnetic field will rotate together with the rotor and will not be aligned with the stator magnetic field, i.e. the aggregate magnetic field not only increases and decreases with the magnetic field of the auxiliary magnets but will change the direction of the magnetic field and it will not be perpendicular to the rotor windings. Since the movable stator 6, similarly to a compass needle, always orientates in the same way to the magnetic field of the stationary stator 1, the magnets of the movable stator 6 will always increase the aggregate magnetic field to which the machine output is directly proportional. I.e. using the same materials, the machine has improved output/size coefficients and output/weight ratios. Or, the same parameters of existing machines can be achieved by using weaker and cheaper magnets, for example by replacing rare-earth elements such as niobium.

Figure 5:
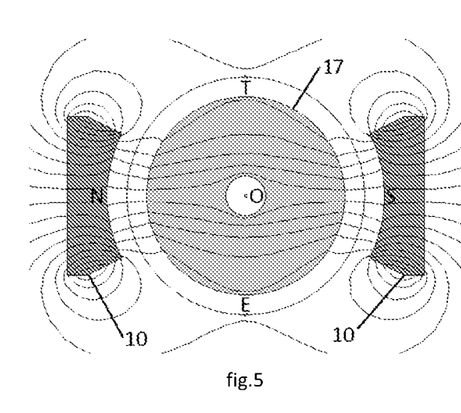
FIG. 5 shows a cross-section of the machine of FIG. 1 with a stator represented by two permanent magnets N and S. The movable ferromagnetic stator is in the form of a homogeneous cylinder.
Figure 6:
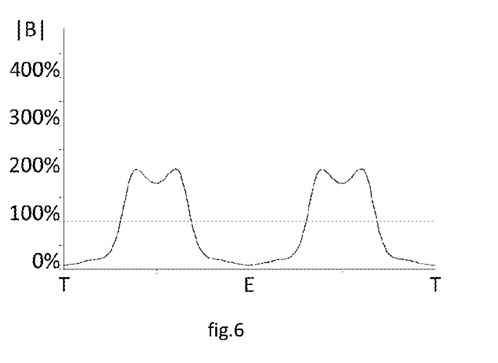
FIG. 6 shows the magnitude of the magnetic field on the T-E-T loop of the machine of FIG. 5.

The mounting of the movable stator 6 has to keep it on the place and to provide free rotation around the machine axis O-O. As the rotor 2 is fixed to the shaft 3, the movable stator 6 can be attached by means of bearings 5 either to the shaft 3 or to the inner surface of the rotor 2. FIGS. 1, 2 and 27 show the two types of mounting. FIGS. 5 and 19 show that because the magnetic field lines connect the closest opposite poles, with the increase of the number of the magnetic poles there is almost no magnetic field in the center. It is possible the movable stators 6 to be needed only in the areas close to the rotor 2.

The movable stator 6 is self-orienting according to the magnetic lines of the magnetic field generated by the stationary stator 1 as the compass needle is oriented towards the Earth's magnetic field, but depending on the type of machine, the movable stator 6 can rotate or be stationary. For example, in an induction motor, the movable stator 6 rotates at the angular speed of the magnetic field generated by the stationary stator 1, i.e. faster than the rotor, whereas in a direct current motor the movable stator 6 is stationary. Regardless of whether or not the movable stator 6 rotates, it does not move relative to the magnetic field of the machine and does not re-magnetize—that reduces the loss and heating of the machine and increases the efficiency. Since the movable stator 6 does not move relative to the magnetic field of the machine, it does not generate eddy currents—heating is reduced and the machine can operate at higher speed. Heating causes rotor deformations and reduces the life of the machine. Avoiding eddy currents simplifies the design and manufacture of the machine as no lamellae or other techniques to avoid eddy currents are required, and thus the cost is reduced. Movable stators can be made from a variety of ferromagnetic materials, not just from soft magnetic steel because the re-magnetizing is avoided and the hysteresis width does not affect the machine losses.

The movable stator 6 may be put in various shapes—cylindrical, conical or a combination of such shapes and made of various materials, including permanent magnets. The movable stator 6 may be composed of several parts, each of which is orientated passively relative to the magnetic field, i.e. even with no mechanical linking between them, they will be oriented towards the magnetic field of the stationary stator 1 and therefore will form a permanent configuration.

The intensity of the magnetic field depends on the distance between the stators 1 and 6 and not the diameter of the rotor 2, as it is created between the fixed and movable stators, i.e. the machine can work even with an unlimitedly big diameter. The magnetic field is generated between the two stators and more complex shapes of the magnetic field can be created because the scattering in the central part of the currently existing machines is avoided. This allows for even an odd number of poles, as shown in FIGS. 23 and 25.

Other factors may require using more than one movable stators 6. For example, if the electrical machine is long, the rotor 2 is to be attached to the shaft 3 at several points to avoid vibration and bending the shaft 3. In that case, the movable stators 6 will be separated from the rotor fasteners 13 but being oriented towards the magnetic field of the stator 1 will form a common configuration of one composite movable stator. Such electrical machines have an improved aerodynamic profile and are suitable for embedding in wind turbines and aircraft/drones. These sequentially arranged movable stators 6 may not be of the same type, but at one end of the machine, they are cylindrical and at the other end conical to obtain the desired profile of the machine and to reduce the vortices of the air.

Skilled in the art will be aware that various modifications of electrical machines with an auxiliary movable stator are feasible, which are also within the scope of the invention as defined in the appended claims. All machine parts could be replaced by technically equivalent elements.

The invention claimed is:

1. A rotary brushed DC electrical machine comprising:
a stator fixed to a housing of the machine, a rotor fixed to a shaft with the possibility of free rotation relative to the stator, as the machine uses a magnetic induction for transmitting energy between the stator and the rotor, wherein the rotor is hollow and includes windings; characterized in that the rotary electrical machine further comprising at least one auxiliary movable stator able to self-orientate towards the magnetic field generated by the machine, as the at least one auxiliary movable stator is made at least partially from ferromagnetic materials and is located coaxially inside the hollow rotor and mounted by means of bearings to the inner part of the rotor or to the shaft with possibility of free and independent rotation with respect to the axis of rotation of the rotor and the shaft;

wherein the rotor is located between the stationary stator and said at least one movable stator.

2. The electrical machine according to claim 1, the rotor being a hollow cylinder.

3. The electrical machine according to claim 1, the ferromagnetic material in the at least one movable stator forming two or more bodies, uniform in shape and arranged symmetrically with respect to the axis of rotation on the periphery of the movable stator.

4. The electrical machine according to claim 1, and the ferromagnetic part of the at least one movable stator being made at least partly of permanent magnets.

5. The electrical machine according to claim 1, and the ferromagnetic part of said at least one movable stator being made entirely of permanent magnets.

6. The electrical machine according to claim 1, the stators having a cross-section with axial symmetry relative to the axis of rotation of the machine.

7. The electrical machine according to claim 1, the stators being arranged in only one part of the periphery of the rotor of the machine.

8. The electrical machine according to claim 1, the machine having more than two magnetic poles.

9. The electrical machine according to claim 8, the number of poles being odd.

10. The electrical machine according to claim 1, wherein the rotor is a hollow cone.

11. The electrical machine according to claim 1, the number of poles of the at least one movable stator being the same as of the poles of the magnetic field generated by the stator.

12. The electrical machine according to claim 4, the permanent magnets of the at least one movable stator forming a bipolar magnet.

* * * * *